(12) United States Patent
Wu et al.

(10) Patent No.: US 10,872,599 B1
(45) Date of Patent: Dec. 22, 2020

(54) WAKEWORD TRAINING

(71) Applicant: Amazon Technologies, Inc., Seattle, WA (US)

(72) Inventors: Shuang Wu, Cambridge, MA (US); Thibaud Senechal, Somerville, MA (US); Gengshen Fu, Sharon, MA (US); Shiv Naga Prasad Vitaladevuni, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/022,057

(22) Filed: Jun. 28, 2018

(51) Int. Cl.
| | |
|---|---|
| *G10L 15/06* | (2013.01) |
| *G10L 15/22* | (2006.01) |
| *G10L 15/08* | (2006.01) |
| *G10L 15/30* | (2013.01) |

(52) U.S. Cl.
CPC ............ *G10L 15/063* (2013.01); *G10L 15/08* (2013.01); *G10L 15/22* (2013.01); *G10L 15/30* (2013.01); *G10L 2015/0635* (2013.01); *G10L 2015/088* (2013.01); *G10L 2015/223* (2013.01)

(58) Field of Classification Search
CPC ....... G10L 15/063; G10L 15/30; G10L 15/08; G10L 15/22; G10L 2015/088; G10L 2015/0635; G10L 2015/223

USPC ....................................................... 704/244
See application file for complete search history.

(56) References Cited

U.S. PATENT DOCUMENTS

| | | | | |
|---|---|---|---|---|
| 5,737,724 A | * | 4/1998 | Atal ...................... | G10L 15/10 704/251 |
| 2013/0289987 A1 | * | 10/2013 | Ganapathiraju ........ | G10L 15/04 704/236 |
| 2019/0066710 A1 | * | 2/2019 | Bryan ..................... | G10L 15/22 |

\* cited by examiner

*Primary Examiner* — Bharatkumar S Shah
(74) *Attorney, Agent, or Firm* — Pierce Atwood LLP

(57) ABSTRACT

A device monitors audio data for a predetermined and/or user-defined wakeword. The device detects an error in detecting the wakeword in the audio data, such as a false-positive detection of the wakeword or a false-negative detection of the wakeword. Upon detecting the error, the device updates a model trained to detect the wakeword to create an updated trained model; the updated trained model reduces or eliminates further errors in detecting the wakeword. Data corresponding to the updated trained model may be collected by a server from a plurality of devices and used to create an updated trained model aggregating the data; this updated trained model may be sent to some or all of the devices.

24 Claims, 13 Drawing Sheets

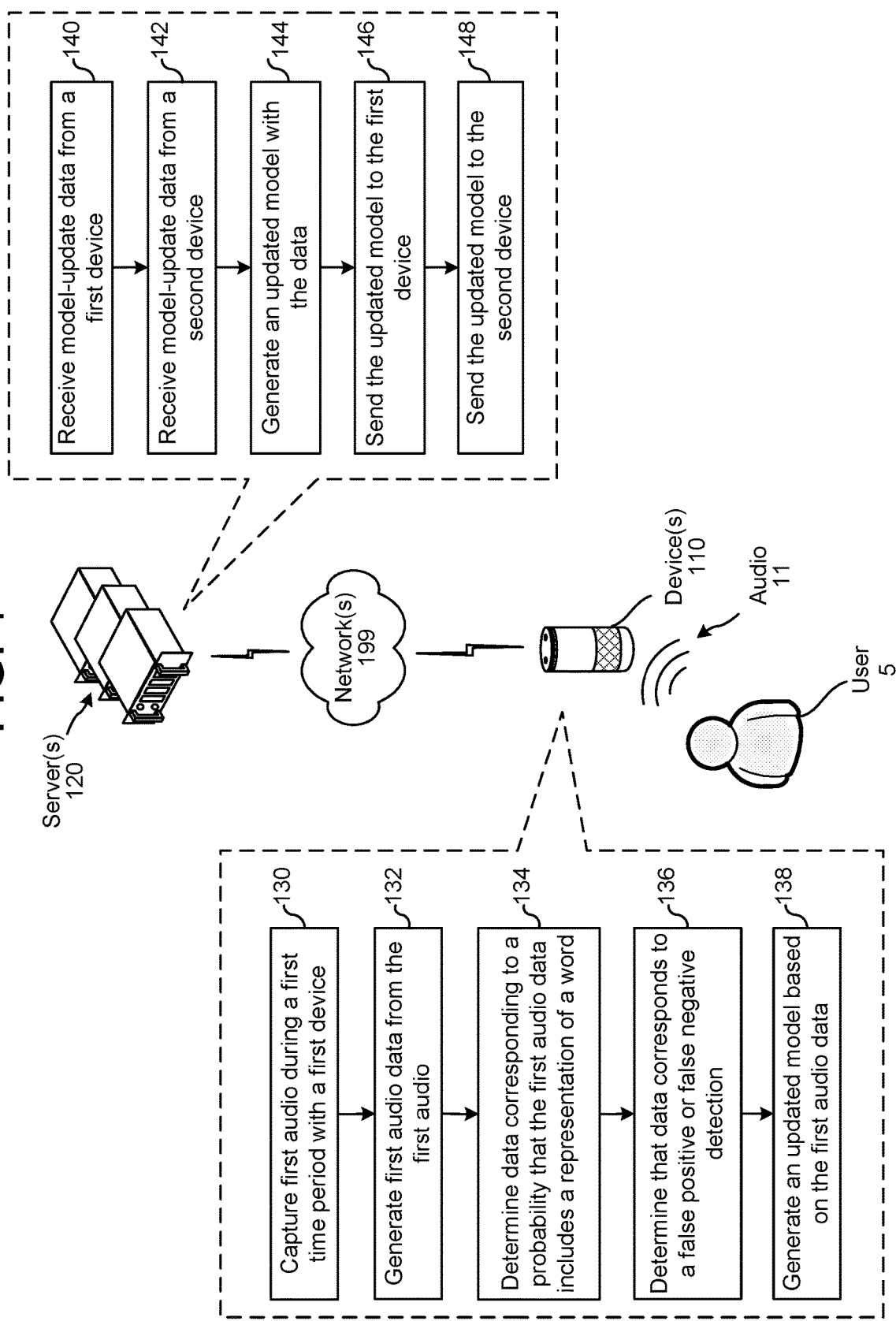

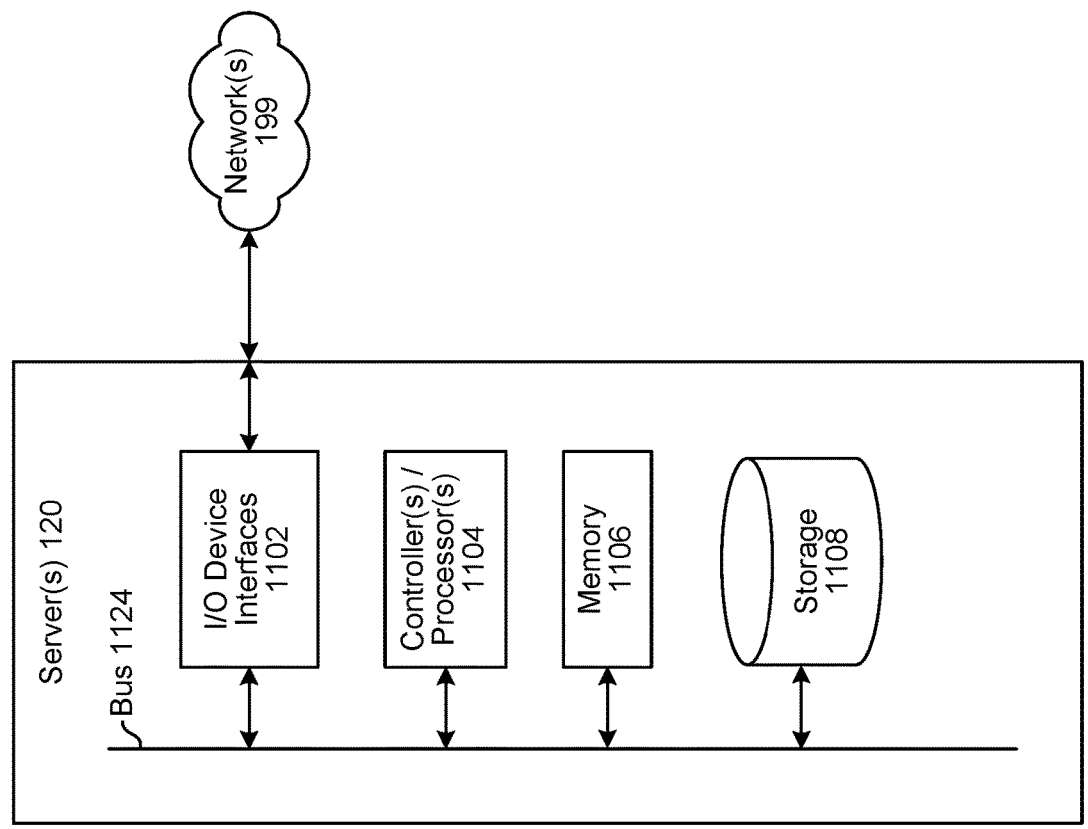

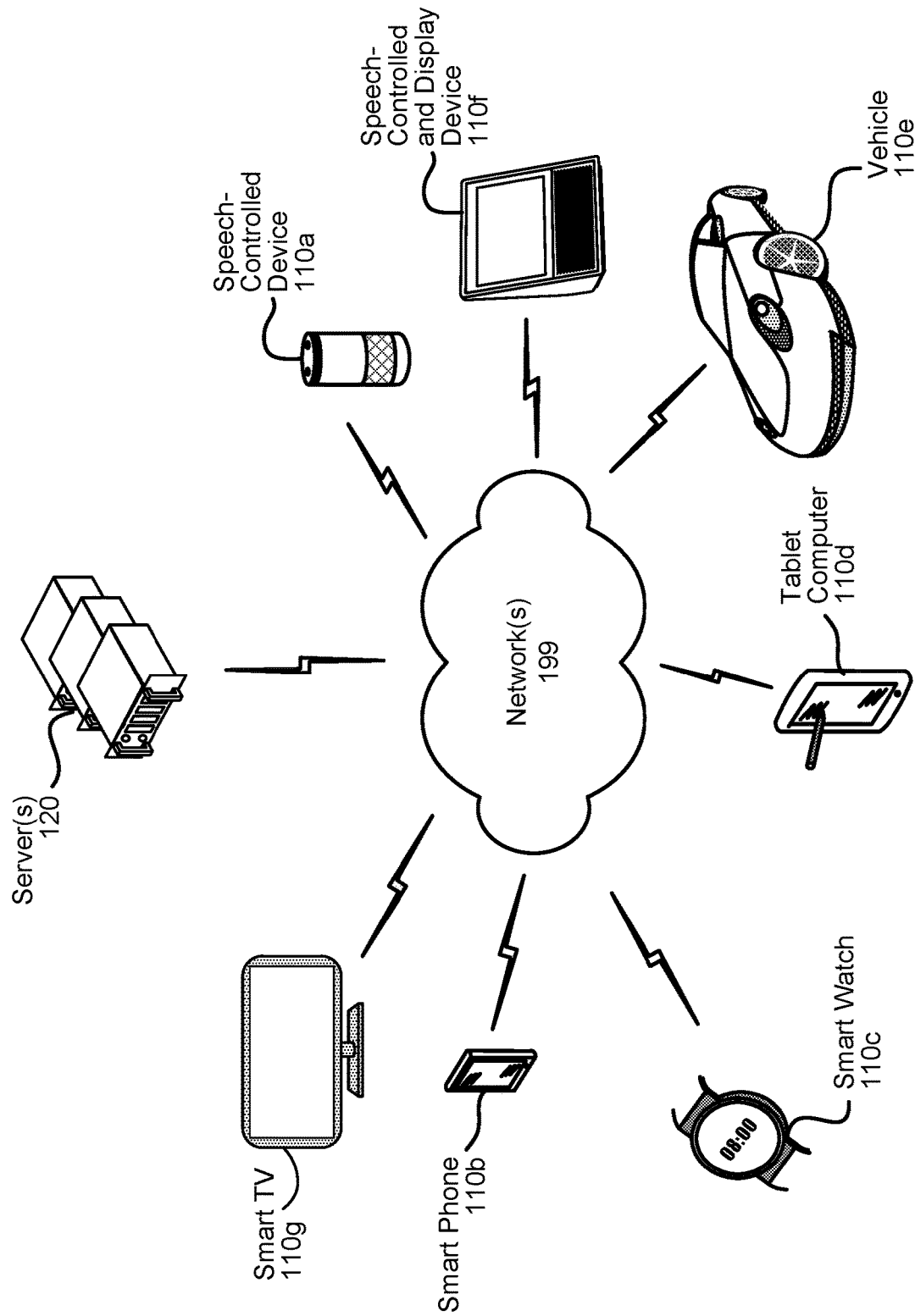

WAKEWORD TRAINING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system for updating a model trained to detect a word according to embodiments of the present disclosure.

FIG. 11 is a block diagram conceptually illustrating example components of a server according to embodiments of the present disclosure.

FIG. 12 illustrates an example of a computer network for use with the speech processing system.

DETAILED DESCRIPTION

Figure 2A:
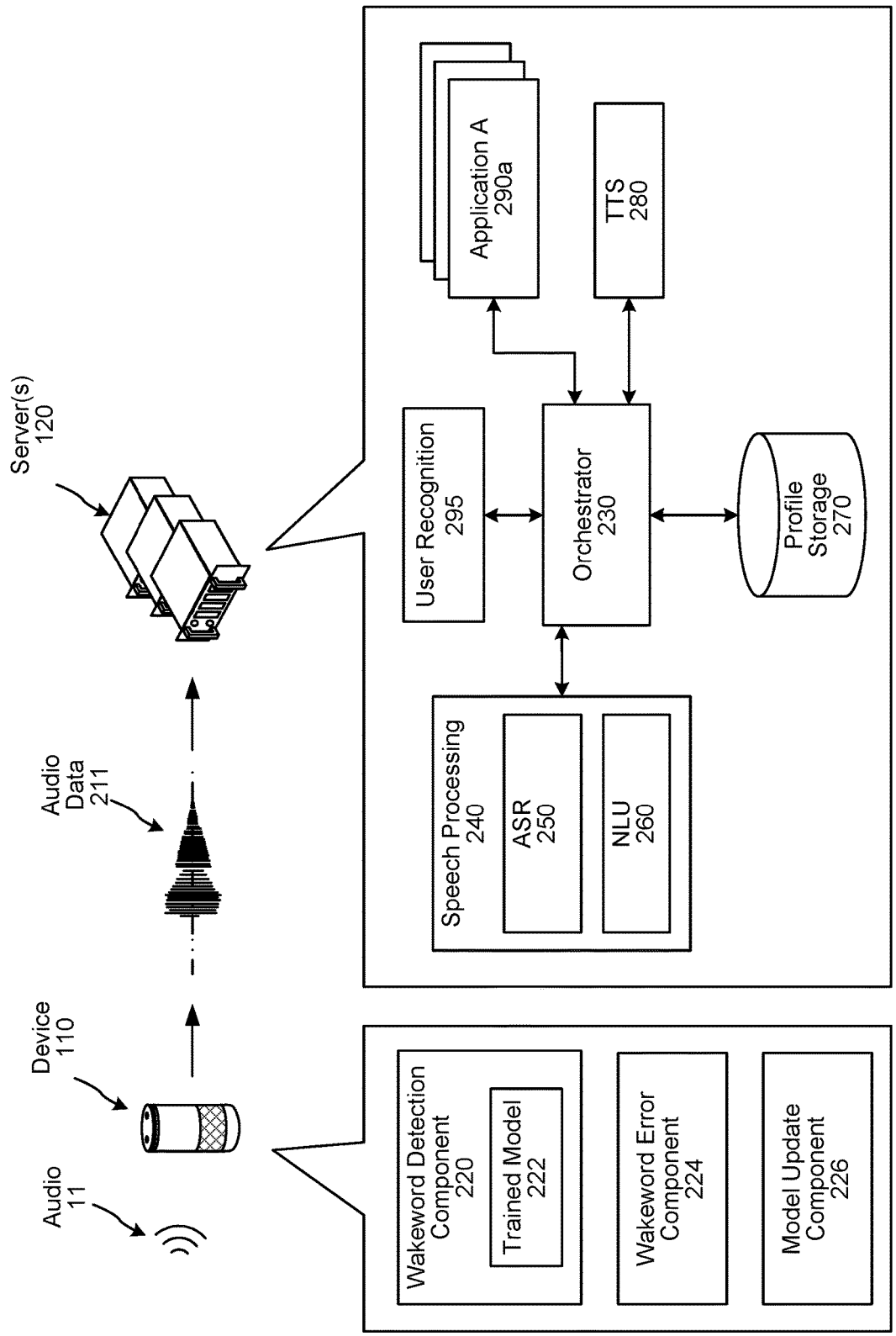
FIG. 2A is a conceptual diagram of components of a system according to embodiments of the present disclosure.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. Text-to-speech (TTS) is a field of computer science, artificial intelligence, and linguistics concerned with enabling computers to output synthesized speech. ASR, NLU, and TTS may be used together as part of a speech processing system.

A device such as a smart speaker, local to a user, may monitor audio to detect a predetermined and/or user-defined wakeword. When the device detects a wakeword in audio data captured by a microphone, the device may send the audio data to a remote system for speech processing for determining output content responsive to the received audio (and/or may perform some action on its own). To determine whether a wakeword is spoken, the device may compare the audio data to a stored wakeword signature. The device may determine data representing a probability that the audio data includes a representation of the wakeword and may determine that this data corresponds to a negative detection of the word or a positive detection of the word. In some embodiments, the data includes a score, and determining that the data corresponds to a positive detection of the word includes determining that the score is greater than a threshold score. If the score is greater than the threshold score, then the device may determine that the wakeword is represented in the audio data and the device may send the audio data to a remote device for further processing (or take other appropriate action). If the score is less than the threshold score, then the device may determine that the wakeword is not represented in the audio data and may act accordingly, for example the device may not send the audio data to the remote system. Embodiments of the present disclosure are not, however, limited to comparing a score to a threshold to determine positive or negative detection of the word. In some embodiments, one or more scores are determined for each of a plurality of time segments corresponding to the audio data; each score may correspond to one or more words or parts of words, such as phones or diphones. In some embodiments, one or more labels may be associated with audio data in each time segment indicating a positive or negative detection or the word.

In some instances, a user may utter a wakeword, but the device determines that the data corresponding the probability does not correspond to a positive detection of the wakeword. This determination may result in the device not waking when the device otherwise should (i.e., a "false-negative" detection of the wakeword). In other instances, the device may determine that the wakeword was spoken when, in fact, it was not (i.e., a "false-positive" detection of the wakeword). Both false negatives and false positives may lead to diminished usefulness of the device, user frustration, and/or other undesirable effects.

Embodiments of the present disclosure improve speech processing systems by reducing or eliminating false-positive and/or false-negative detection of wakewords. In various embodiments, false positives and/or false negatives are detected using one or more of the various techniques described herein, and a trained model is updated based on the detection of the false positive and/or false negative. The updated trained model may thus reduce the number of future false positives and/or false negatives. In various embodiments, the updating of the model is performed at the device by, for example, back-propagating differences between a stored, expected wakeword and a wakeword represented in captured audio. Each device may thus include a trained model updated one or more times to account for how a particular user or users speaks the wakeword, which may include differences due to an accent, speech impediment, background noise, or other such differences. In some embodiments, information related to the update to the trained model may be sent from one or more devices to one or more server devices, which may aggregate the update information, use it to update a trained model, and send the updated trained model to some or all other devices.

FIG. 1 illustrates how a device 110 may update a trained model when a false-negative detection and/or false-positive detection is determined. Although the figures and discussion illustrate certain operational steps of the system in a particular order, the steps described may be performed in a different order (as well as certain steps removed or added) without departing from the intent of the disclosure. A device 110 local to a user 5 and one or more server(s) 120 may communicate across one or more networks 199.

The device 110 captures (130) audio 11 corresponding to an utterance of the user 5 (or other source of sound or speech). The device 110 may include one or more microphones that are enabled to continuously receive the first audio 11. The device 110 generates (132) first audio data corresponding to the first audio 11. The device 110 may include a rolling buffer such that first audio data is input to the rolling buffer at a rate at which first audio data is deleted from the rolling buffer.

The device 110 determines (134) data corresponding to a probability that the first audio data includes a representation of a word (e.g., a wakeword). The device 110 may use various techniques to determine the data. For example, the device 110 may first apply voice activity detection (VAD) techniques executed by a VAD/beam selection component of the device 110. Such VAD techniques may determine whether speech is present in the first audio data based on various quantitative aspects of the first audio data, such as the spectral slope between one or more frames of the first audio data, the energy levels of the first audio data in one or more spectral bands the signal-to-noise ratios of the first audio data in one or more spectral bands; or other quantitative aspects. In other examples, the device 110 may implement a trained classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the first audio data to one or more acoustic models in speech storage, which acoustic models may include models corresponding to speech, noise (e.g., environmental noise or background noise), or silence. Still other techniques may be used to determine whether speech is present in the first audio data.

The device 110 may determine (134) data corresponding to the probability that the wakeword is represented in the first audio data. This process may also be referred to as keyword detection, with the wakeword being a specific example of a keyword. Illustrative wakewords include "Alexa," "Echo," and "Computer"; the wakeword may be any other word and may be determined by the user. The device then determines (136) that the data corresponds to a false-positive detection of the keyword or a false-negative detection of the keyword and generates (138) an updated model based on the first audio data.

In some embodiments, the server(s) 120 receives (140) first model-update data (e.g., error data) from a first device 110 and receives (142) second model-update data from a second device 110. As explained in greater detail below, any number of devices 110 may send any number of model-update data to the server(s) 120. The servers(s) 120 generates (144) an updated model using the received model-update data, sends (146) the updated model to the first device 110, and sends (148) the updated model to the second device 110.

The system may operate using various components as described in FIG. 2A. The various components may be located on a same or on one or more different physical devices. Communication between various components may occur directly or across the network(s) 199.

The device 110 may receive audio 11 using an audio capture component, such as a microphone or array of microphones. The device 110 may use VAD techniques to determine if audio data, corresponding to the audio 11, includes speech. If the device 110 determines the audio data includes speech, a wakeword detection component 220 processes the audio data to determine if a wakeword is represented therein. Following detection of a wakeword, the device 110 sends audio data 211, corresponding to at least an utterance following the wakeword in the audio data, to the server(s) 120.

The wakeword detection component 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM involved. Such a wakeword detection component 220 may estimate the posteriors of wakewords with context information, either by stacking frames within a context window for a DNN, or using an RNN. Follow-on posterior threshold tuning or smoothing may be applied for decision making. Other techniques for wakeword detection, such as those known in the art, may also be used.

Figure 2B:
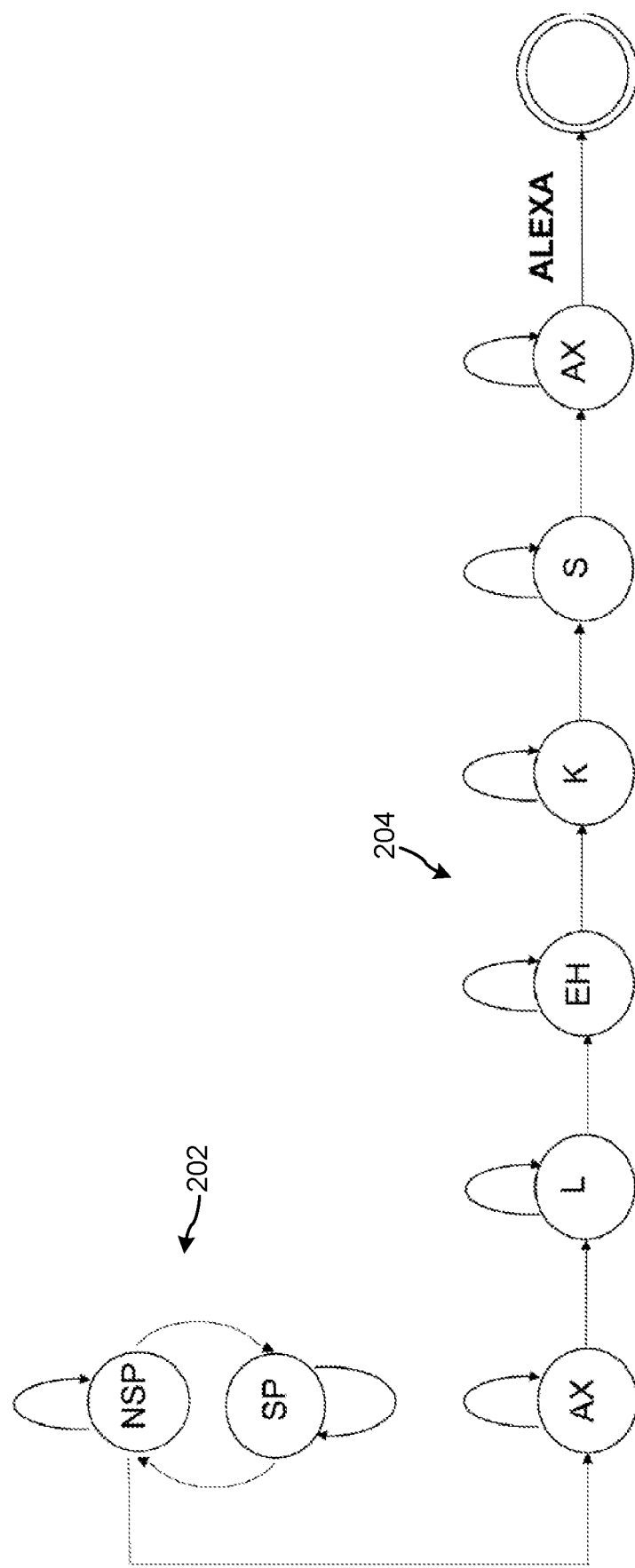
FIG. 2B is a conceptual diagram illustrating how wakeword detection is performed according to embodiments of the present disclosure.

In an example, as illustrated in FIG. 2B, the wakeword detection component 220 may implement a Hidden Markov Model (HMM) with a foreground wakeword path 204 and a background speech/nonspeech path 202. The foreground wakeword path 204 represents states corresponding to phonemes of the wakeword. Although other wakewords may be used, in this example the wakeword is "Alexa" represented by phonemes of <AX> for the initial "A" sound of "Alexa," "<L> for the "L" sound, <EH> for the "E" sound, <K> and <S> for the combined "X" sound, followed by <AX> for the final "A" sound. Viterbi decoding may be performed for the competing foreground wakeword path and background speech/nonspeech path, and wakeword hypothesis may be triggered when a log-likelihood ratio of the foreground path versus the background path exceeds a predetermined threshold. Once the ratio exceed the predetermined threshold, features may be extracted from the audio data and fed into one or more second stage classifiers, which could be a support vector machine (SVM) or deep neural network (DNN). The second stage classifier(s) may determine if the features correspond to a wakeword or not.

As explained in greater detail below, a wakeword error component 224 may determine occurrence of a false-positive detection of the wakeword and/or occurrence of a false-negative detection of the wakeword; in some embodiments, the server(s) 120, instead or in addition, determines occurrence of the false-positive detection of the wakeword and/or occurrence of the false-negative detection of the wakeword and send an indication of the occurrence to the wakeword error component 224. The wakeword error component 224 may further, instead or in addition, determine occurrence of the false-positive detection and/or false-negative detection by receiving user input (e.g., a button press) or by receiving sensor data. If such a determination is made, a model-update component 226 may update the trained model using the audio data 211.

Upon receipt by the server(s) 120, the audio data 211 may be sent to an orchestrator component 230. The orchestrator component 230 may include memory and logic that enables the orchestrator component 230 to transmit various pieces and forms of data to various components of the system.

The orchestrator component 230 sends the audio data 211 to a speech processing component 240. An ASR component 250 of the speech processing component 240 transcribes the audio data 211 into text data representing one more hypotheses representing speech contained in the audio data 211. The ASR component 250 interprets the utterance in the audio data 211 based on a similarity between the utterance and pre-established language models. For example, the ASR component 250 may compare the audio data 211 with models for sounds (e.g., subword units, such as phonemes, etc.) and sequences of sounds to identify words that match the sequence of sounds spoken in the utterance represented in the audio data 211. The ASR component 250 sends (either directly or via the orchestrator component 230) the text data generated thereby to an NLU component 260 of the speech processing component 240. The text data output by the ASR component 250 may include a top scoring hypothesis or may include an N-best list including multiple hypotheses. An N-best list may additionally include a score associated with each hypothesis represented therein. Each score may indicate a confidence of ASR processing performed to generate the hypothesis with which it is associated.

The NLU component 260 attempts to make a semantic interpretation of the phrases or statements represented in the text data input thereto. That is, the NLU component 260 determines one or more meanings associated with the phrases or statements represented in the text data based on individual words represented in the text data. The NLU component 260 determines an intent (e.g., a system action that a user desires the system to perform) representative of text data as well as pertinent pieces of information in the text data that allow a device (e.g., the device 110, the server(s) 120, etc.) to execute the intent. For example, if the text data corresponds to "play Adele," the NLU component 260 may determine a user intended the system to output Adele music, which the NLU component 260 determines is represented by a <PlayMusic> intent.

The orchestrator component 230 (or another component of the server(s) 120) may send NLU results data to an application component 290 associated with the intent. The application component 290 determines output data based on the NLU results data. For example, if the NLU results data includes intent data corresponding to <PlayMusic> and tagged text corresponding to <Artist: Adele>, the orchestrator 230 (or other component of the server(s) 120) may send the NLU results data to a music application component, which determines Adele music audio data for output by the system.

In some instances, an application 290 may provide output text data responsive to received NLU results data. The server(s) 120 may include a text-to-speech (TTS) component 280 that generates output audio data from application-provided output text data. The TTS component 280 may use different synthesis techniques. In one method of synthesis called unit selection, the TTS component 280 analyzes text data against a database of recorded speech. The TTS component 280 selects units of recorded speech matching the text data and concatenates the units together to form output audio data. In another method of synthesis called parametric synthesis, the TTS component 280 varies parameters such as frequency, volume, and noise to create output audio data including an artificial speech waveform. Parametric synthesis uses a computerized voice generator, sometimes called a vocoder.

The server(s) 120 may include a user-recognition component 295. The user-recognition component 295 may take as input the audio data 211 and/or input text data output by the ASR component 250. The user-recognition component 295 determines scores indicating whether the speech represented in the audio data 211 originated from a particular user. For example, a first score may indicate a likelihood that the speech originated from a first user, a second score may indicate a likelihood that the speech originated from a second user, etc. The user-recognition component 295 also determines an overall confidence regarding the accuracy of user recognition operations. The user-recognition component 295 may perform user recognition by comparing audio characteristics in the audio data 211 to stored audio characteristics of users. The user-recognition component 295 may also perform user recognition by comparing biometric data (e.g., fingerprint data, iris data, etc.) received by the system in correlation with the audio 11 to stored biometric data of users. The user-recognition component 295 may further perform user recognition by comparing image data (e.g., including a representation of at least a feature of a user) received by the system in correlation with the audio 11 with stored image data (e.g., including representations of features of users). The user-recognition component 295 may perform additional user recognition processes, including those known in the art. Output of the user-recognition component 295 may be used to inform NLU processing as well as processing performed by applications 290.

The server(s) 120 may include user profile storage 270. The user profile storage 270 may include a variety of information related to individual users, groups of users, etc. that interact with the system. The user profile storage 270 may include one or more customer profiles. Each customer profile may be associated with a different customer ID. A customer profile may be an umbrella profile specific to a group of users. That is, a customer profile encompasses two or more individual user profiles, each associated with a respective user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 270 is implemented as part of the server(s) 120. However, it should be appreciated that the user profile storage 270 may be in communication with the server(s) 120, for example over the network(s) 199. User profile data may be used to inform NLU processing as well as processing performed by application 290.

Figure 3:
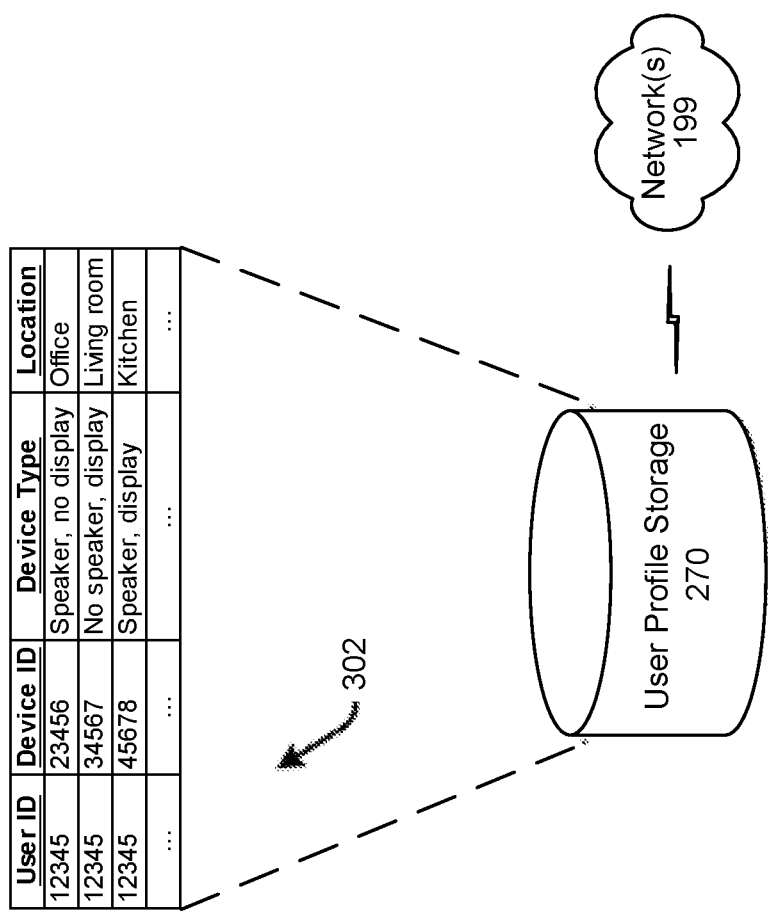
FIG. 3 illustrates data stored and associated with user profiles according to embodiments of the present disclosure.

FIG. 3 illustrates the user profile storage 270 that includes data regarding customer profiles as well as individual user profiles 302. Each user profile 302 may include information indicating various devices, output capabilities of each of the various devices, and a location of each of the various devices. Each user profile 302 may additionally include other data not explicitly illustrated.

Figure 4:
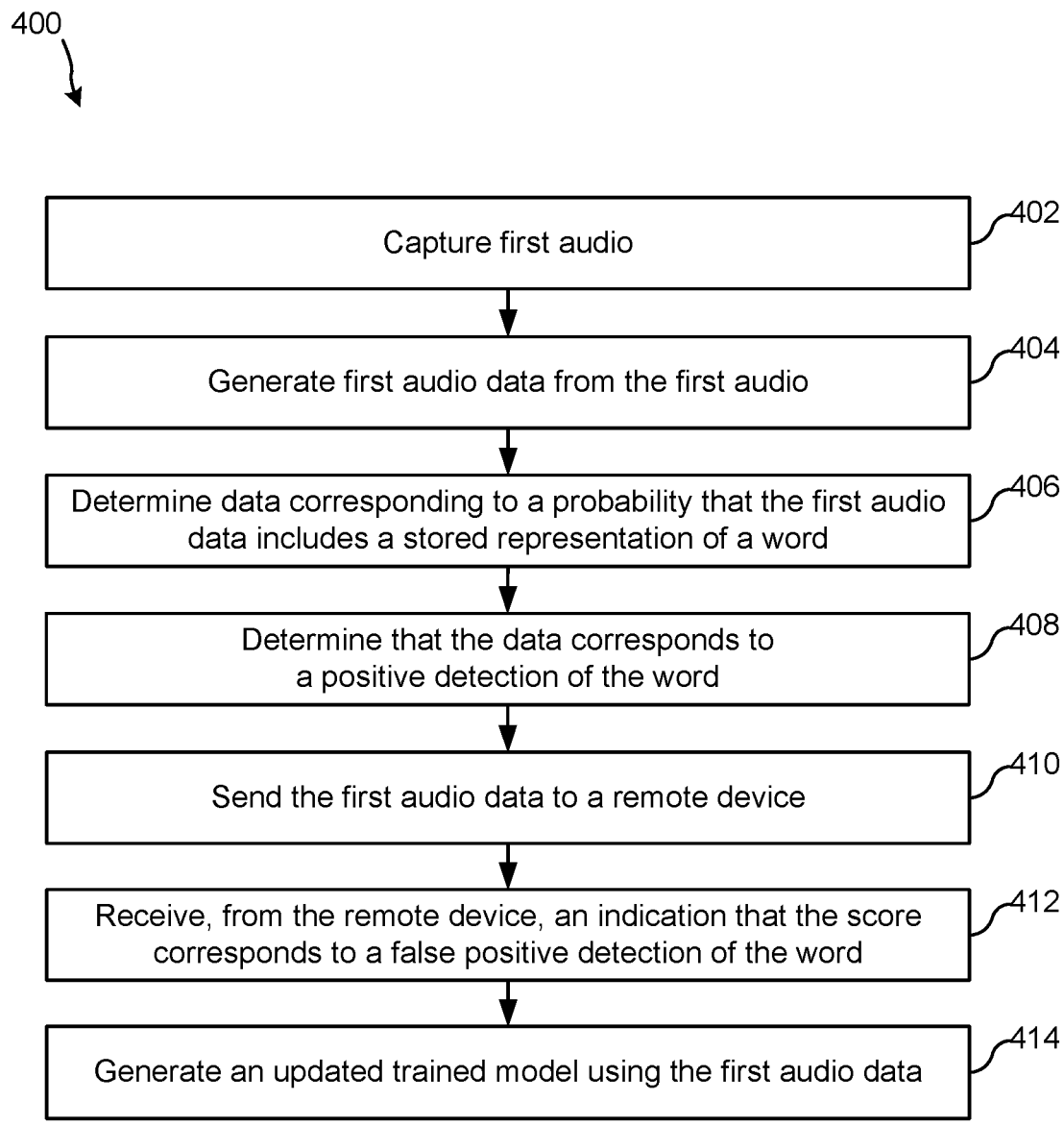
FIG. 4 is a process flow diagram illustrating how a system may update a trained model after determining a false positive detection of a word according to embodiments of the present disclosure.

FIG. 4 illustrates a process flow 400 for detecting a false-positive detection of a wakeword. The device 110 captures (402) first audio and generates (404) first audio data from the first audio. The device 110 determines (406) data corresponding to a probability that the first audio data includes a stored representation of a word (e.g., a wakeword) using any of the techniques described above. The device 110 determines (408) that the data corresponds to a positive detection of the keyword by, e.g., determining that an associated score is greater than a threshold score (i.e., the device 110 determines that the first audio contains a representation of the word). Based on this determination, the device 110 sends (410) the first audio data to the server 120. The server 120, using any of the speech-recognition techniques described herein, determines that the first audio data does not include a command, request, or other such user input corresponding to an intending speaking of the wakeword—i.e., the determination of the score corresponds to a false-positive detection of the wakeword. The server 120 accordingly sends an indication of the false-positive detection to the device 110, which receives (412) the indication. In other embodiments, the device 110 instead or in addition determines that the first audio data does not include the command, request, or other such user input. Based on this determination and/or on receiving the indication, the device 110 generates (414) an updated trained model using the first audio data by, for example, back-propagating error data created from the difference between a candidate representation of the wakeword in the audio data and a stored representation of the wakeword. The model may be updated by, for example, back-propagating the error data from output nodes back to hidden and input nodes; the method of back-propagation may include gradient descent.

Figure 5:
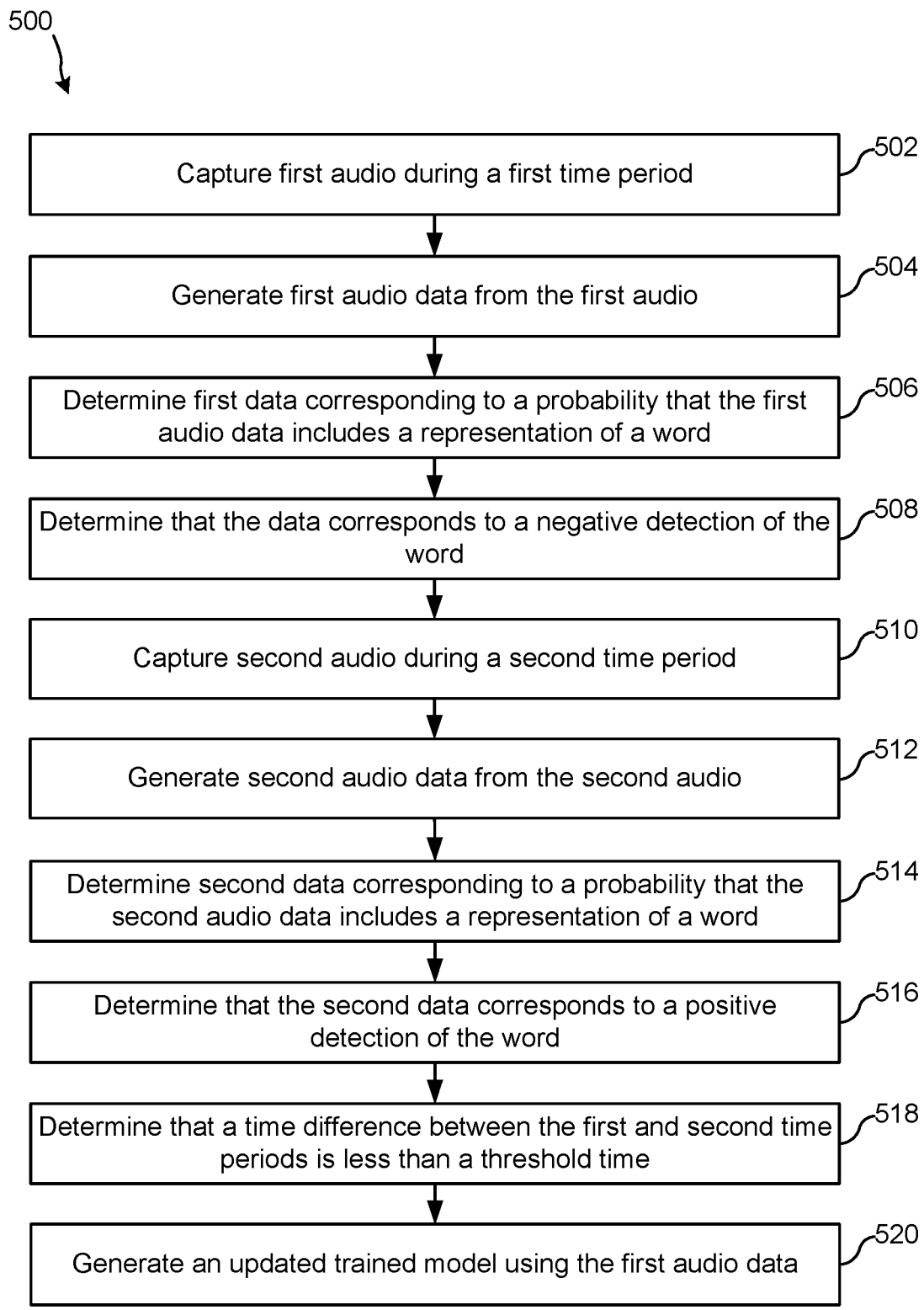
FIG. 5 is a process flow diagram illustrating how a system may update a trained model after determining a false-negative detection of a word according to embodiments of the present disclosure.

FIG. 5 illustrates a process flow 500 for detecting a false-negative detection of a wakeword. The device 110 captures (502) first audio during a first time period and generates (504) first audio data from the first audio. The device 110 determines (506) first data (e.g., a first score or first label) corresponding to a probability that the first audio data includes a representation of a word (e.g., a wakeword) and determines (508) that the first data corresponds to a negative detection of the wakeword (i.e., the wakeword is not present in the first audio) by, for example, determining that an associated score is less than a threshold score. During a second time period after the first time period, the device 110 captures (510) second audio and generates (512) second audio data using it. The first time period and the second time period may each be any length of time and may be defined by, for example, their starting and finishing times or their starting and duration times. The lengths of the first time period and the second time period may vary or may be fixed. A time difference between the first time period and the second time period may be computed by, for example, determining the difference in their starting times, ending times, midpoint times, or start and end times. The device 110 determines (514) second data (e.g., a second score) corresponding to a probability that the second audio data includes a representation of the word and determines (516) that the second data corresponds to a positive detection of the wakeword (e.g., that the second score is greater than the threshold score). The device 110 determines (518) that a time difference between the first and second time periods is less than a threshold time. The threshold time may be, for example, one second, two seconds, five seconds, or any other time. As described herein, if a user utters a wakeword but the device 110 does not wake, the user is likely to repeat the wakeword soon after (e.g., one, two, or five seconds after). The device 110 may detect the repeated wakeword because the user speaks it more loudly, more clearly, and/or with less background noise. Based on the time difference, the device 110 determines that the first score corresponds to a false-negative detection of the keyword. The device 110 thus generates (520) an updated trained model using the first audio data (e.g., using a difference between the first audio data and a stored representation of the keyword).

Figure 6:
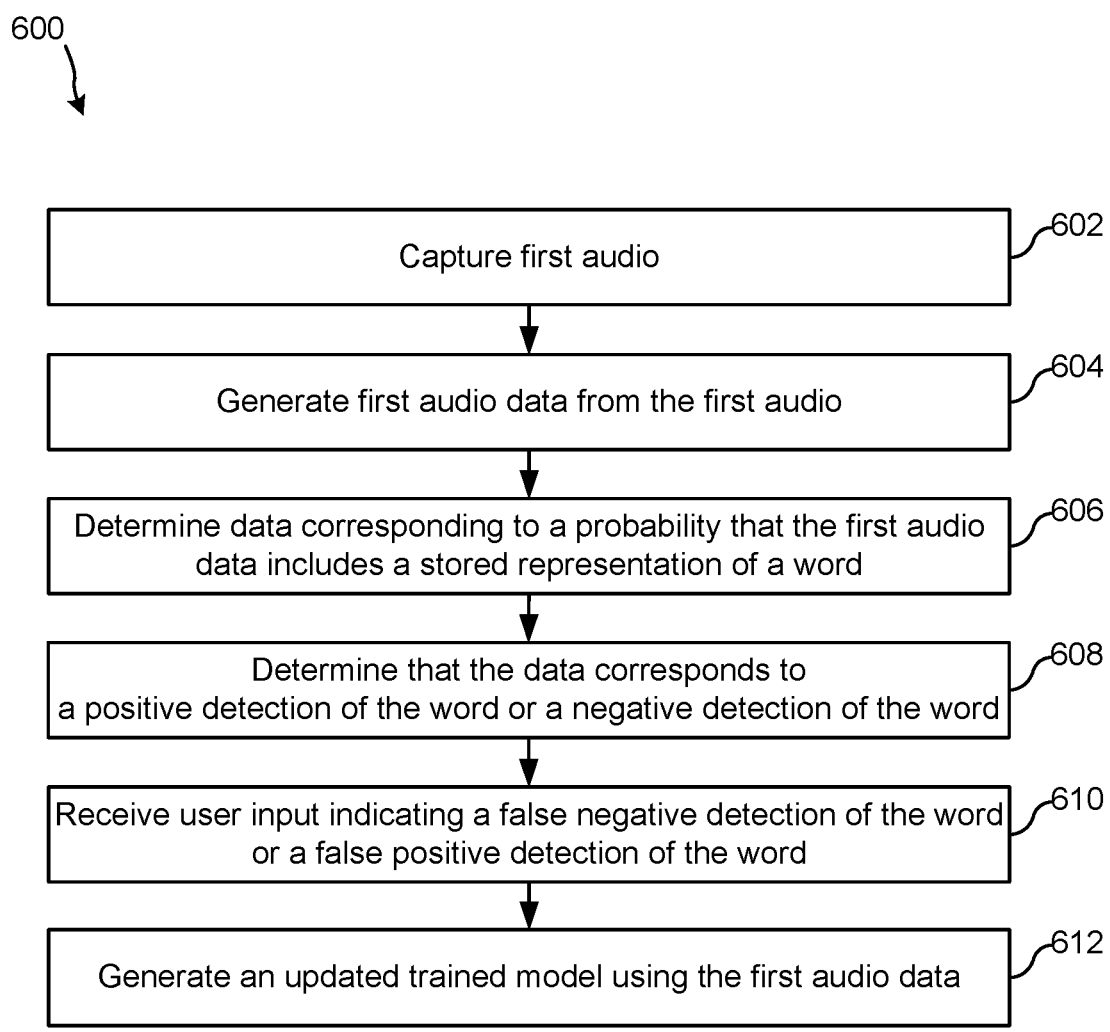
FIG. 6 is a process flow diagram illustrating how a system may update a trained model after receiving user input indicating a false positive detection of a word or a false negative detection of the word according to embodiments of the present disclosure

FIG. 6 illustrates a process flow 600 for determining a false-negative detection or false-positive detection of a wakeword. The device 110 captures (602) first audio during a first time period and generates (604) first audio data from the first audio. The device 110 determines (604) that the data corresponds to a positive detection of the wakeword or that the data corresponds to a negative detection of the wakeword. The device 110 receives (610), however, user input indicating a false negative detection of the wakeword or user input indicating a false positive detection of the wakeword. The user input may be, for example, a button press, a verbal command, a hand gesture, or any other such input. For example, a user may utter the wakeword but the device 110 determines that the data corresponds to a negative detection of the wakeword. In response, the user may press a button on the device 110, perform a gesture, or utter a command indicating the negative detection is a false negative detection. Similarly, the user may not utter the wakeword but the device 110 determines that the data corresponds to a positive detection of the wakeword. In response, the user may similarly press the button, perform the gesture, or utter the command indicating the positive detection is a false positive detection. The device 110 therefore generates (612) an updated trained model using the first audio data.

Figure 7:
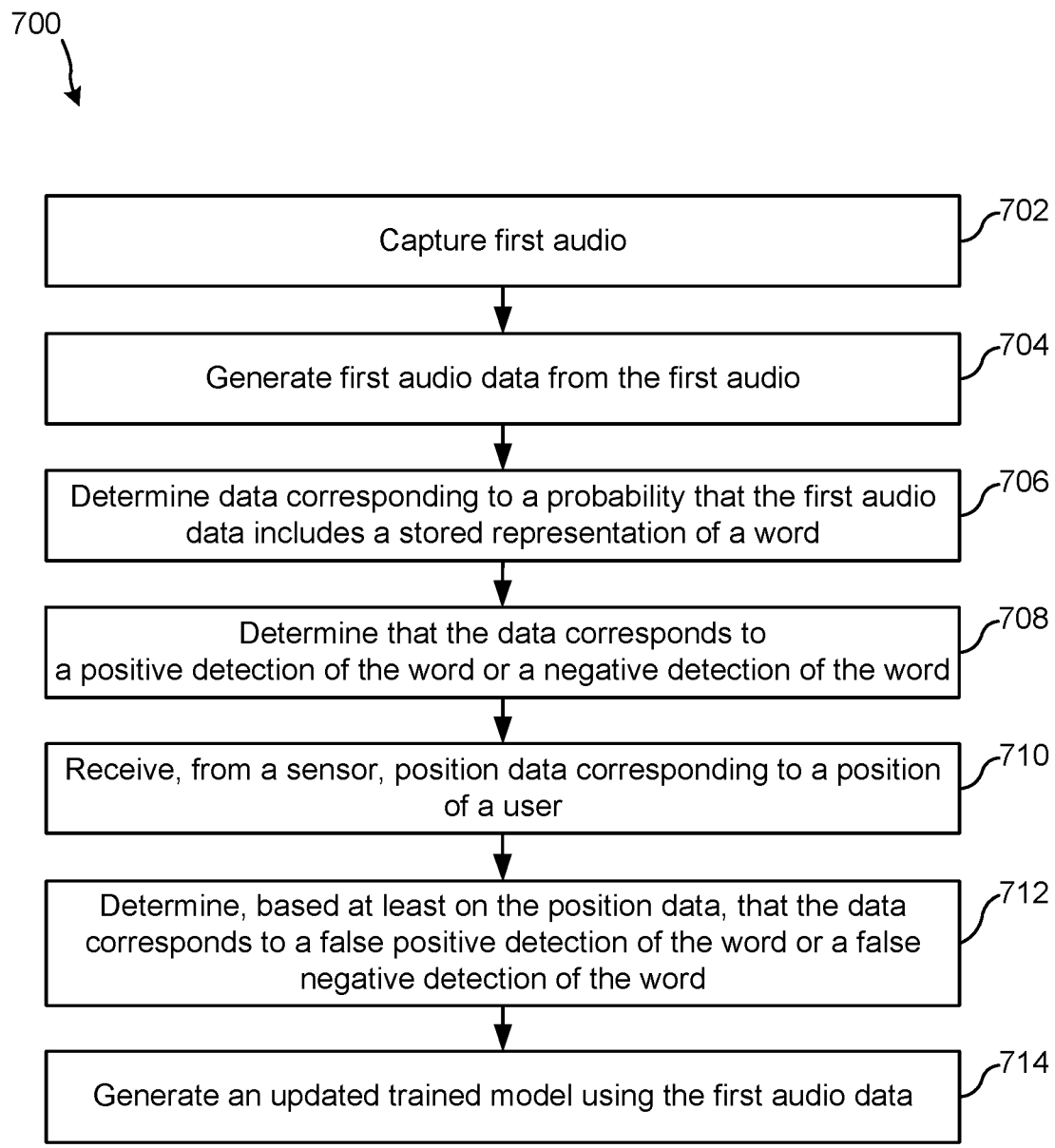
FIG. 7 is a process flow diagram illustrating how a system may update a trained model after determining, based on sensor data, a false positive detection of a word or a false negative detection of the word according to embodiments of the present disclosure

FIG. 7 illustrates a process flow 700 for determining a false-negative detection or false-positive detection of a wakeword. The device 110 captures (702) first audio during a first time period and generates (704) first audio data from the first audio. The device 110 determines (704) that the data corresponds to a positive detection of the wakeword that the data corresponds to a negative detection of the wakeword. The device 110 also receives (710), however, position data from a sensor corresponding to a position of a user. The sensor may be, for example, one or more cameras disposed on or otherwise in communication with the device 110, and the device 110 may determine the position data by determining that the user is within a field of view of one or more of the cameras. The sensor may be, for example, on or more motion sensors, and the device 110 may determine the position data by determining that the user is moving the device 110. Any other type of sensor is, however, within the scope of the present disclosure. The device 110 determines (712), based on the position data, that the data corresponds to a false negative detection of the word or a false negative detection of the word. For example, the device 110 may determine that the data corresponds to a positive detection of the keyword but may further determine, based on the position data, that a user is not proximate the device 110. Similarly, the device 110 may determine that the device corresponds to a negative detection of the word but may further determine, based on the position data, that the user is proximate the device 110. The device 110 therefore generates (612) an updated trained model using the first audio data.

Figure 8B:
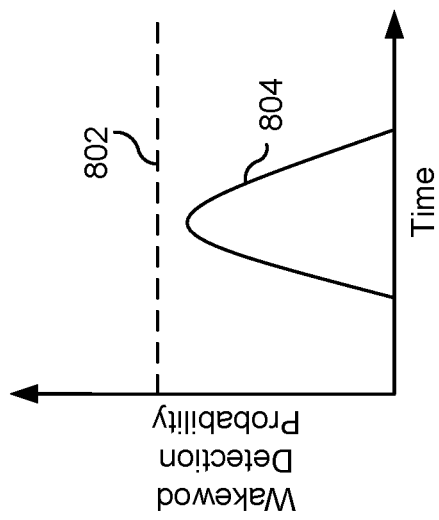
FIGS. 8A and 8B illustrate probabilities, generated by a model, that audio data includes a representation of a word before and after updating the model according to embodiments of the present disclosure.
Figure 8A:
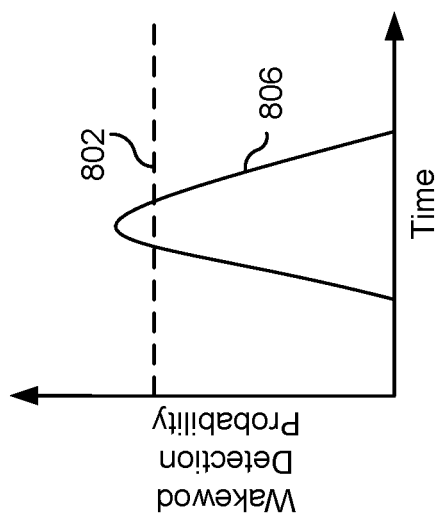

FIGS. 8A and 8B illustrate a false negative detection of a wakeword by a trained model and later positive detection of the wakeword using an updated trained model. FIG. 8A illustrates a wakeword detection probability versus time; if a score 804 corresponding to a probability that audio data includes a representation of a wakeword is greater than a first threshold probability 802, the device 110 determines that the wakeword is represented in the audio data. In FIG. 8A, however, though the user 5 uttered the wakeword, the score 804 is determined to be less than the threshold 802. As explained above, the trained model is updated with the audio data such that, when the user 5 again utters the wakeword, the score 806 is greater than the threshold 802.

Figure 9B:
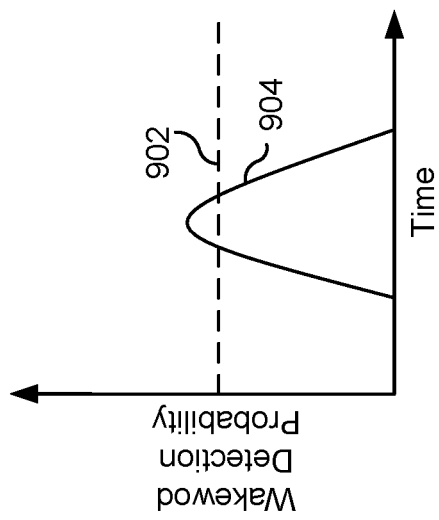
FIGS. 9A and 9B illustrate probabilities, generated by a model, that audio data includes a representation of a word before and after updating the model according to embodiments of the present disclosure.
Figure 9A:
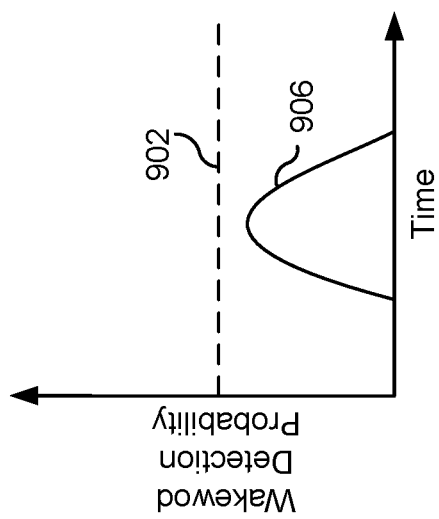

FIGS. 9A and 9B illustrate a false positive detection of a wakeword by a trained model and later negative detection of the wakeword using an updated trained model. In FIG. 9A, the user 5 (or other source of sound or speech) issues an utterance that does not include the wakeword, but the corresponding score 904 is determined to be greater than the threshold 902. The trained model is updated using the audio data such that, when the user 5 or other source again issues the utterance, the score 906 is less than the threshold 902.

As discussed above, two or more devices 110 may detect wakeword-detection errors, generate error data based thereon, and send the error data to the server 120. The server 120 may then aggregate the error data, create an updated trained model based thereon, and send the updated trained model to the devices 110. The server 120 may select only a portion of the error data sent from the devices 110 based on its quality, similarity, or other such metric. The server 120 may further group the error data by region of origin, country of origin, or other such geographic metric and may create an updated model specific for each region. Thus, for example, users of devices 110 having a region-specific accent may receive updated models customized to their accent. The server 120 may further group error data based on speech impediments, such as lisps, and create updated models customized to the speech impediment. If a user is determined to belong to such a group, the server 120 may send the corresponding updated model to the device 110 of the user, even if no error data is received from that device 110.

In some embodiments, the device 110 analyzes the error data prior to using it to update the trained model and/or sending it to the server 120; if the error data exceeds threshold error data, the device 110 does not use it to update the trained model or send it to the server 120. For example, a wakeword-detection error may be determined, but audio data corresponding to the error may be unsuitable because it is garbled or noisy. In addition, the audio data may be unsuitable because the user was intentionally trying to confuse the device 110. In some embodiments, the device 110 prompts the user with an audio prompt to utter the wakeword.

In some embodiments, the device 110 determines that the user wishes to change the wakeword. The device 110 may determine that audio data corresponding to an utterance does not contain the stored wakeword but that additional audio data corresponding to one or more additional utterances have scores similar to that of the first audio data. If the utterances occur within a time threshold and if the scores are similar within a score threshold, the device 110 may create error data based on the utterances, as described herein, and update the trained model based thereon. For example, if the user wishes to change the wakeword to "HAL," the user may utter the phrase, "HAL, open the pod bay doors" two or more times in rapid succession (e.g., within one, two, or five seconds). The device 110 determines that the score of the word "HAL" is less than the threshold score corresponding to the stored wakeword but further determines that the scores for each repeat are similar; based thereon, the device 110 correspondingly updates the model. In some instances, the user is not attempting to change the wakeword, but simply does not know what it is; by similarly repeating a wakeword and command, the device 110 may similarly update the model.

The trained model and other models described herein, which are implemented by components of the system, may be trained and operated according to various machine-learning techniques. Such techniques may include, for example, neural networks (such as deep neural networks (DNNs) and/or recurrent neural networks (RNNs)), inference engines, and trained classifiers. Examples of trained classifiers include Support Vector Machines (SVMs), neural networks, decision trees, adaptive boosting (AdaBoost) combined with decision trees, and random forests. For example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The wakeword detection component 220 may implement one or more trained models trained using user specific speech processing data. The wakeword detection component 220 may be configured with trained models trained with respect to respective users. Thus, the device 110 may perform user recognition processing to determine a current user, and send an indication of same to the wakeword detection component 220 so the wakeword detection component can implement one or more trained models trained with respect to the current user.

In some embodiments, the trained model is a deep neural network (DNN) that is trained using distributed batch stochastic gradient descent; batches of training data may be distributed to computation nodes where they are fed through the DNN in order to compute a gradient for that batch. The device 110 may update the DNN by computing a gradient by comparing audio data with a stored representation of a wakeword and back-propagating error data based thereon. In some embodiments, the DNN includes additional forward pass targets that estimate synthetic gradient values and the device 110 updates the DNN by selecting one or more synthetic gradient values.

As described above, the wakeword detection component 220 may implement device specific and/or user specific machine learned models. However, one skilled in the art will appreciate that one or more machine learned models may be trained using both device specific speech processing data and user specific speech processing data. The more data types used to train a machine learning model, the more accurate a resulting trained model will be in predicting whether the wakeword detection sensitivity should be lowered. For example, other data that may be used to train a machine learning model includes a type of the device 110, a location of the device 110 (e.g., a geographic location or a location with a building), etc.

As described herein, the wakeword detection component 220 may take as input audio data. The wakeword detection component 220 may also take as input other data, such as a number of humans detected by the device 110. The device 110 may determine a number of humans by determining different human speech within audio data corresponding to received audio. The device 110 may also determine a number of humans by capturing at least one image and processing image data corresponding to the at least one image to determine representations corresponding to human shapes.

As described herein above, the wakeword detection component 220 may implement one or more trained models to determine when to adjust a wakeword detection sensitivity. The wakeword detection component 220 may alternatively or also be configured to adjust a wakeword detection sensitivity in response to the device 110 receiving an instruction to do so from the server(s) 120. This allows the server(s) 120 to have greater control over wakeword detection performed by devices 110 associated with the server(s) 120.

As described with respect to and illustrated in FIGS. 4 and 5, the server(s) 120 may train the model(s) and send same to the device 110 for implementation at runtime. However, one skilled in the art will appreciate that in certain instances the device 110 may be configured to receive historical speech processing data from the server(s) 120 as well as perform the processes to train a model(s).

A wakeword detection model(s) trained by the device 110 may be simpler than a wakeword detection model(s) that is trained by the server(s) 120 and pushed to the device 110 since training data available to the device 110 may be more limited than training data available to the server(s) 120. For example, the device 110 may be limited to training data corresponding to time between detections of wakewords whereas the server(s) 120 may additionally have access to user-specific training data.

The data that may be used to train a model(s) as well as input to a model(s) at runtime may vary depending on the system. The data may include a duration of time between audio streams (e.g., duration of time between previous detection of a wakeword and a current time, duration of time between different audio data transmissions from the device 110 to the server(s) 120 in response to detections of wakewords).

The server(s) 120 may determine output data using an application. An application may enable the server(s) 120 to execute specific functionality in order to provide data or produce some other output requested by a user. The server(s) 120 may be configured with more than one application. For example, a weather application may enable the server(s) 120 to provide weather information, a ride sharing application may enable the server(s) 120 to book a trip with respect to a taxi or ride sharing service, an food order application may enable the server(s) 120 to order a pizza with respect to a restaurant's online ordering system, etc.

Figure 10:
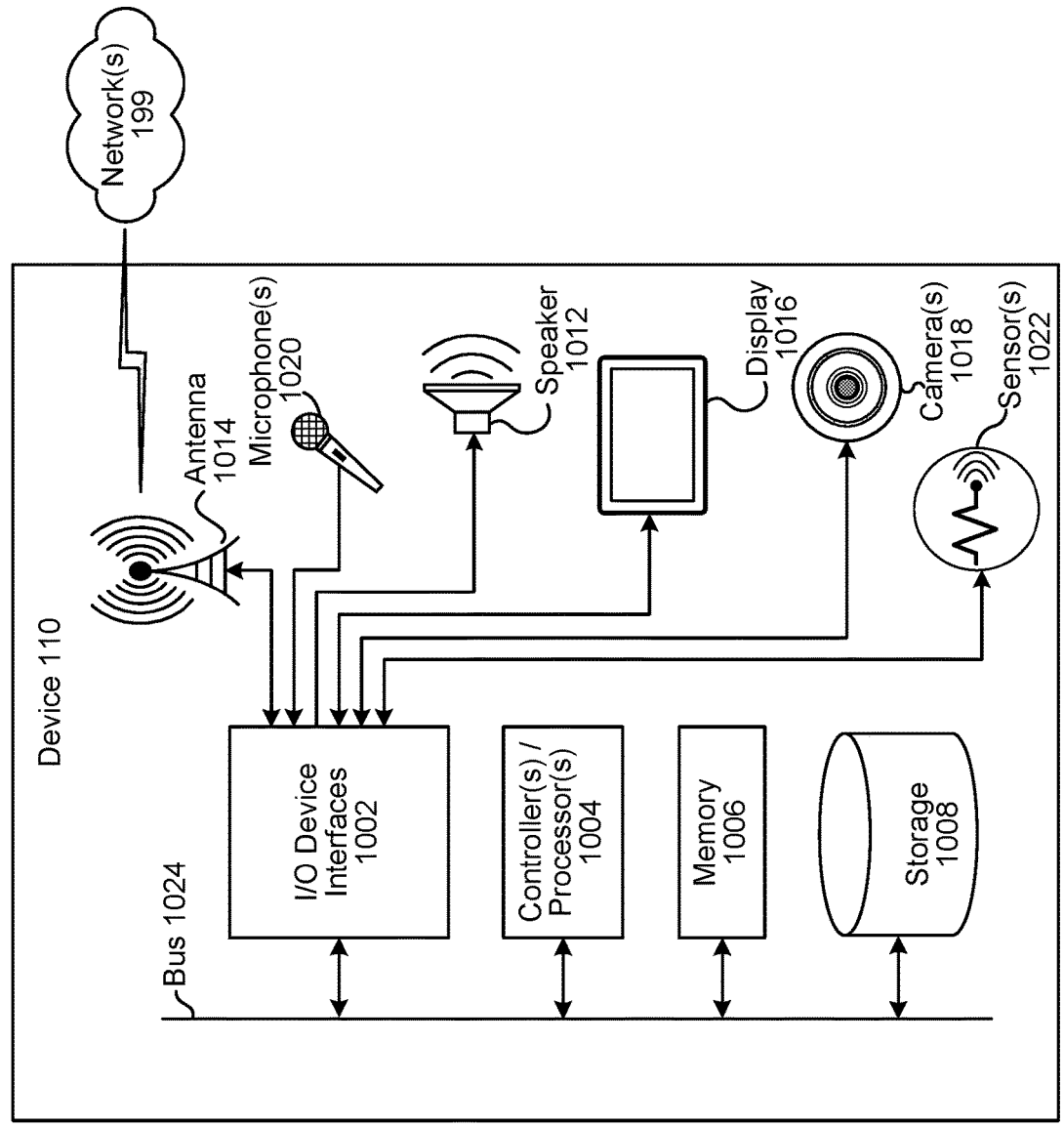
FIG. 10 is a block diagram conceptually illustrating example components of a device according to embodiments of the present disclosure.

FIG. 10 is a block diagram conceptually illustrating a device 110 that may be used with the system. FIG. 11 is a block diagram conceptually illustrating example components of a remote device, such as the server(s) 120, which may assist with ASR processing, NLU processing, etc. Multiple servers 120 may be included in the system, such as one or more servers 120 for performing ASR, one or more servers 120 for performing NLU, etc. In operation, each of these devices (or groups of devices) may include computer-readable and computer-executable instructions that reside on the respective device (110/120), as will be discussed further below.

Each device (110/120) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1002/1102).

Computer instructions for operating each device (110/120) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/

1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 8, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. The device 110 may additionally include a display 1016 for visually presenting content. The device 110 may also include one or more camera(s) 1018 and one or more sensor(s) 1022, such as motion sensors, accelerometers, temperature sensors, etc.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110 and the server(s) 120 may include their own dedicated processors, memory, and/or storage. Alternatively, one or more of the components of the device 110 and the server(s) 120 may utilize the I/O interfaces (1002/1102), processor(s) (1004/1104), memory (1006/1106), and/or storage (1008/1108) of the device 110 and server(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the server(s) 120, as described herein, are illustrative, and may be located as a stand-alone device or may be included, in whole or in part, as a component of a larger device or system.

As illustrated in FIG. 12, multiple devices (110a-110g, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection and display device 110f, and/or a smart TV 110g may be connected to the network(s) 199 through a wireless service provider, over a WiFi or cellular network connection, or the like. Other devices are included as network-connected support devices, such as the server(s) 120, skill server(s) 125, or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   generating first audio data from first audio, the first audio detected by a first device during a first time period;
   determining, using a model, a first probability that the first audio data includes a representation of at least a portion of a word;
   determining that the first probability corresponds to at least one of a false positive detection of the at least the portion of the word or a false negative detection of the at least the portion of the word; and
   determining, in response to the first probability corresponding to the at least one of the false positive detection or the false negative detection, error data corresponding to a difference between the representation of at least the portion of the word and a stored representation of at least the portion of the word.

2. The computer-implemented method of claim 1, wherein determining that the first probability corresponds to the at least one of the false positive detection or the false negative detection further comprises:
   determining that the first probability indicates the word is not represented in the first audio data;
   capturing, using the first device during a second time period, second audio;
   generating second audio data from the second audio;
   determining, using the model, a second probability that the second audio data includes the representation of the word;
   determining that the second probability indicates the word is represented in the second audio data; and
   determining, based at least in part on the second probability indicating the word is represented in the second audio data, that the first probability falsely indicated the word is not represented in the first audio data.

3. The computer-implemented method of claim 2, further comprising:
   determining a time difference between at least one of a starting time, a midpoint time or an ending time of the first time period and at least one of a starting time, a midpoint time or an ending time of the second time period; and
   determining that the time difference is less than a threshold time difference,
   wherein determining that the first probability falsely indicated the word is not represented in the first audio data is based at least in part on determining that the time difference is less than the threshold time difference.

4. The computer-implemented method of claim 2, wherein determining that the first probability falsely indicated the word is not represented in the first audio data is based at least in part on a time difference between at least one of a starting time, a midpoint time or an ending time of the first time period and at least one of a starting time, a midpoint time or an ending time of the second time period.

5. The computer-implemented method of claim 1, wherein the first probability corresponds to the false negative detection of the word, and further comprising:
   capturing, using the first device during a second time period, second audio;
   generating second audio data from the second audio;
   determining, using the model, second data corresponding to a second probability that the second audio data includes the representation of the word;
   determining a time difference between at least one of a starting time, a midpoint time or an ending time of the first time period and at least one of a starting time, a midpoint time, or an ending time of the second time period; and
   determining that the time difference is less than a threshold time,
   wherein determining the first probability corresponds to the false negative detection of the word is based at least in part on determining that the time difference is less than the threshold time.

6. The computer-implemented method of claim 1, further comprising:
   determining a gradient descent value corresponding to a difference between a candidate representation of the at least the portion of the word in the first audio data and the representation of the at least the portion of the word; and
   determining an updated model parameter value for the model based at least on the gradient descent value.

7. The computer-implemented method of claim 6, further comprising:
   receiving, at a server device, the gradient descent value from the first device;
   receiving, at the server device, a second gradient descent value from a second device different from the first device;
   generating an updated model based at least in part on the gradient descent value and the second gradient descent value;
   sending the updated model to the first device; and
   sending the updated model to the second device.

8. The computer-implemented method of claim 1, further comprising:
   receiving, at a server device, the error data from the first device;
   receiving, at the server device, second error data from a second device different from the first device;
   generating an updated model based at least in part on the error data and the second error data;
   sending the updated model to the first device; and
   sending the updated model to the second device.

9. A system comprising:
   at least one processor; and
   at least one memory including instructions that, when executed by the at least one processor, cause the system to:
      generate first audio data from first audio, the first audio detected by a first device during a first time period;
      determine, using a model, a first probability that the first audio data includes a representation of at least a portion of a word;
      determine that the first probability corresponds to at least one of a false positive detection of the at least the portion of the word or a false negative detection of the at least the portion of the word; and
      determine, in response to the first probability corresponding to the at least one of the false positive detection or the false negative detection, error data corresponding to a difference between the representation of at least the portion of the word and a stored representation of at least the portion of the word.

10. The system of claim 9 wherein the at least one memory further includes instructions that cause the system to determine that the first probability corresponds to the at least one of the false positive detection or the false negative detection at least in part by:
   determining that the first probability indicates the word is not represented in the first audio data;
   capturing, using the first device during a second time period, second audio;
   generating second audio data from the second audio;
   determining, using the model a second probability that the second audio data includes the representation of the word; determining that the second probability indicates the word is represented in the second audio data; and
   determining, based at least in part on the second probability indicating the word is represented in the second audio data, that the first probability falsely indicated the word is not represented in the first audio data.

11. The system of claim 10, wherein the at least one memory further includes instructions that cause the system to:
   determine a time difference between at least one of a starting time, a midpoint time or an ending time of the first time period and at least one of a starting time, a midpoint time or an ending time of the second time period; and
   determine that the time difference is less than a threshold time difference,
   wherein determining that the first probability falsely indicated the word is not represented in the first audio data is based at least in part on determining that the time difference is less than the threshold time difference.

12. The system of claim 9, wherein the first probability corresponds to the false negative detection of the word, and wherein the at least one memory further includes instructions that cause the system to:
   capture, using the first device during a second time period, second audio;
   generate second audio data from the second audio;
   determine, using the model, second data corresponding to a second probability that the second audio data includes the representation of the word;
   determine a time difference between at least one of a starting time, a midpoint time or an ending time of the first time period and at least one of a starting time, a midpoint time or an ending time of the second time period; and
   determine that the time difference is less than a threshold time,
   wherein determining the first probability corresponds to the false negative detection of the word is based at least in part on determining that the time difference is less than the threshold time.

13. The system of claim 9, wherein the at least one memory further includes instructions that cause the system to:
   determine a gradient descent value corresponding to a difference between a candidate representation of the at least the portion of the word in the first audio data and the representation of the at least the portion of the word; and
   determine an updated model parameter value for the model based at least on the gradient descent value.

14. The system of claim 13, wherein the at least one memory further includes instructions that cause the system to:
   receive, at a server device, the gradient descent value from the first device;
   receive, at the server device, a second gradient descent value from a second device different from the first device;
   generate an updated model based at least in part on the gradient descent value and the second gradient descent value;
   send the updated model to the first device; and
   send the updated model to the second device.

15. The computer-implemented method of claim 1, wherein the first probability corresponds to the false negative detection of the word, and the method further comprises:
   generating second audio data from second audio, the second audio detected by the first device during a second time period;
   determining, using the model, that the second audio data includes a representation of at least a portion of the word; and
   based on determining that that the second audio data includes the representation of at least the portion of the word, determining that the word is a wakeword.

16. The system of claim 9, wherein the at least one memory further includes instructions that further cause the system to:
   generate second audio data from second audio, the second audio detected by the first device during a second time period;
   determine, using the model, that the second audio data includes a representation of at least a portion of the word; and
   based on determining that that the second audio data includes the representation of at least the portion of the word, determine that the word is a wakeword.

17. The system of claim 9, wherein the at least one memory further includes instructions that further cause the system to determine that the first probability corresponds to the at least one of the false positive detection or the false negative detection at least in part by:
   determining that the first probability indicates that the word is represented in a first portion of the first audio data;
   determining that a command or a request is not represented in a second portion of the first audio data following the first portion; and
   determining, based at least in part on the command or the request not being represented in the second portion, that the first probability falsely indicates that the word is represented in the first portion.

18. The system of claim 17, wherein the at least one memory further includes instructions that cause the system to determine that the command or the request is not represented in the second portion of the first audio data at least in part by:
   sending, to a remote device, at least the second portion of the first audio data; and
   receiving, from the remote device, an indication that the second portion of the first audio data does not correspond to the command or the request.

19. The system of claim 9, wherein the at least one memory further includes instructions that further cause the system to:
   generate, using the error data, an updated model;
   generate second audio data from second audio, the second audio detected by the first device during a second time period; and determining using the updated model, a second probability that the second audio data includes a representation of at least a portion of the word.

20. The computer-implemented method of claim 1, wherein determining that the first probability corresponds to the at least one of the false positive detection or the false negative detection further comprises:
    determining that the first probability indicates that the word is represented in a first portion of the first audio data;
    determining that a command or a request is not represented in a second portion of the first audio data following the first portion; and
    determining, based at least in part on the command or the request not being represented in the second portion, that the first probability falsely indicates that the word is represented in the first portion.

21. The computer-implemented method of claim 20, wherein determining that the command or the request is not represented in the second portion of the first audio data further comprises:
    sending, to a remote device, at least the second portion of the first audio data; and
    receiving, from the remote device, an indication that the second portion of the first audio data does not correspond to the command or the request.

22. The computer-implemented method of claim 1, further comprising:
    generating, using the error data, an updated model;
    generating second audio data from second audio, the second audio detected by the first device during a second time period; and
    determining, using the updated model, a second probability that the second audio data includes a representation of at least a portion of the word.

23. The computer-implemented method of claim 1, further comprising:
    determining an updated model based at least in part on the first probability.

24. The system of claim 13, wherein the at least one memory further includes instructions that cause the system to:
    determine an updated model based at least in part on the first probability.

* * * * *